Feb. 17, 1970   J. V. R. DELME   3,495,377
MEANS FOR FEEDING TETRAHEDRAL PACKAGES INTO
A TRANSPORT CONTAINER
Filed Aug. 25, 1967   8 Sheets-Sheet 1

INVENTOR
J.V.R. DELME

BY *Earle R. Marden*
ATTORNEY

Feb. 17, 1970  J. V. R. DELME  3,495,377
MEANS FOR FEEDING TETRAHEDRAL PACKAGES INTO
A TRANSPORT CONTAINER
Filed Aug. 25, 1967  8 Sheets-Sheet 2

INVENTOR
J.V. R. DELME

BY *Earle R. Marden*
ATTORNEY

United States Patent Office 3,495,377
Patented Feb. 17, 1970

1

3,495,377
MEANS FOR FEEDING TETRAHEDRAL PACK-
AGES INTO A TRANSPORT CONTAINER
Johan V. R. Delme, Lund, Sweden, assignor to AB Tetra
Pak, Lund, Sweden, a Swedish company
Filed Aug. 25, 1967, Ser. No. 663,362
Claims priority, application Sweden, Sept. 23, 1966,
12,815/66
Int. Cl. B65b 5/10, 35/56
U.S. Cl. 53—142                                 4 Claims

ABSTRACT OF THE DISCLOSURE

Apparatus to feed tetrahedron shaped packages into a transport container that is substantially symmetrical about a central vertical axis. The transport container is preferably hexagonal and the apparatus includes a tetrahedron holder which has two spaced apart legs through which one of the transverse seals of the tetrahedron package projects to support the container. The holder is hinged to allow the holder to drop downward to allow the tetrahedrons to drop into the transport container.

The present invention relates to a means for feeding tetrahedral packages into a transport container of the kind that is substantially symmetrical about a central vertical axis.

Although the invention is not bound to any particular shape of the transport container—in accordance with the principles of the invention, pentagonal, hexagonal, completely round, etc., transport containers can be filled on condition that an edge angle of the tetrahedron substantially corresponds to 360° divided by the number of packages in each layer—in what follows the invention will be described in further detail with regard to a hexagonal transport container, which for the sake of simplicity will be hereinafter called a case. The container preferably has the form of a hexagonal prism with six, substantially rectangular, slightly outwardly-inclining walls and a base that comprises mainly a pyramid bounded by six, substantially congruent, isosceles triangular faces. For example, the container can be of the shape shown in Swedish Patent 150,453.

In the container described, compact insertion of the tetrahedral packages is possible in several layers, each of six tetrahedrons. The tetrahedrons in the bottom layer are inserted beside each other in such a manner that they have one of their edges situated in a plane at right angles to the container axis and at least with the end of this edge bearing against the side wall. The tetrahedrons in the second layer are forced on insertion to engage one of their edges downwards in the wedge-shaped space between the bottom layer tetrahedrons and with the ends of the opposite edge bearing against the side wall, whilst the tetrahedrons in the third layer are inserted beside each other in such a manner that they at least with the end of one edge bear against the side wall and, with the downturned side of the tetrahedron originating from this edge, rest

2 against the upturned tetrahedron side of at least one tetrahedron in the middle layer.

In Swedish Patent 191,494 there is a description of a method and a means for automatically feeding the tetrahedrons into the previously described transport container. The method according to the above-mentioned patent specification discloses that the separate packages are carried by a conveyor to an unloading point and unloaded at three feeder stations so that each package drops freely into position in one of the transport containers, during which the free fall of each is controlled in such a manner that during the fall it will execute any alteration in position necessary for it to land in the place intended for the package in question, and before the insertion of the immediate following package the transport container is given an angular displacement of 60 degrees about the central axis of the latter, and after the insertion of a layer each transport container is moved forward to the following feeder station. Preferably during its fall, each package is made to execute a rotary movement about a horizontal centre-of-mass axis parallel to one of its two sealing edges.

Means for execution of this method have been designed in large numbers and have long been in use. Although operating in a satisfactory way, however, these means have a fundamental disadvantage. They are very expensive to manufacture. Among other factors, this is connected with the condition that the number of feeder stations is three and that the separate tetrahedrons at each station must be controlled in a specific way. In order to attain the necessary precision, the controlling elements must be constructed with great accuracy. This, together with the difficulties of standardizing the various parts, increases the cost of product to a high degree.

A primary object of the present invention is therefore to indicate a solution to the problem of designing a means that greatly reduces production costs. A basic element in the means according to the invention is a holder arranged above the transport container that is to be filled. The holder according to the invention has two legs, side walls or similar elements by means of which, assuming a substantially horizontal position, it is capable of supporting a tetrahedral package in such a manner that one end of the package is turned downwards towards the bottom of the transport container and so that the plane of symmetry of the package through the said edge will coincide with a plane through the vertical axis of the transport container. The holder is also arranged hinged in the said plane in a direction downwards towards the bottom of the container and inwards towards its vertical axis from the said horizontal position to a position in which the package can leave the holder and drop into the transport container.

One of the great merits of the holder described above is that its range of application is very versatile. Thus the holder can be regarded as a standard element, which can be included as a basic element in a number of different embodiments of feeder equipment. Despite its wide application, the holder is also very simple as regards design, and therefore inexpensive to produce. Even the other elements that must be included in the feeder equipment can be made uncomplicated by the use of the holders. This is connected with the fact that the holders have assumed several functions, which in the means according to the said Swedish Patent 191,494 were carried out by special elements. In addition to holding, the holders also act as releasing and guiding elements. All these factors, the holder's character of standard element, its simplicity with regard to design, and its capacity to assume several functions contribute to make the feeder device cheap to manufacture. It should be pointed out that this does not take place at the expense of accuracy of insertion. Neither does the capacity of the means diminish in relation to the equipment used hitherto. On the contrary the invention indicates solutions as to how the capacity can be increased substantially.

The invention will now be described in further detail with reference to the accompanying drawings, of which:

FIGS. 1a—1c show a hexagonal transport container from above in different stages of filling with tetrahedrons, of which

Figure 1A:
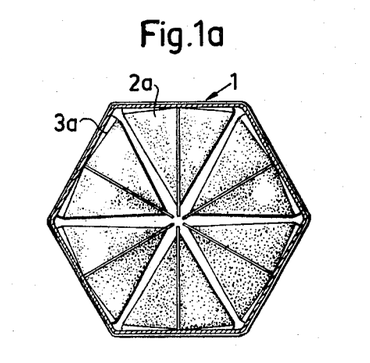
FIG. 1a shows the bottom layer.

Arranging the terahedrons in the container 1 takes place in the following manner, which is not characteristic for the present invention only, but also, for example, for the above-mentioned Swedish Patent 150,453.

A bottom layer of six terahedrons 2a is first inserted by a method illustrated in FIG. 1a, so that each tetrahedron 2a with one boundary face bears on one of the triangular faces of the bottom pyramid, and with a flat-pressed sealing edge 3a along the edge between the base and one of the outer walls. The other tetrahedral face originating from the same sealing edge 3a will then closely conform to the outer wall, since the edge angle between this wall and the base is substantially equal to the tetrahedron's edge angle.

Figure 1B:
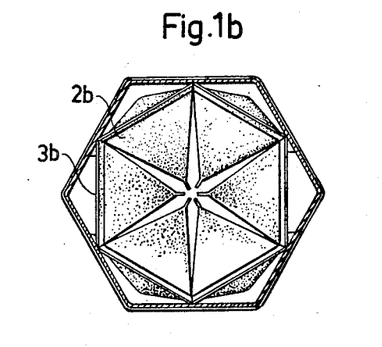

Between the tetrahedrons 2a in the above-mentioned bottom layer, wedge-shaped spaces are thereby formed with a wedge angle substantially equal to the edge angle of the tetrahedron, since the inwardly-turned edge angle between two adjacent triangular faces in the pyramidal base is equivalent to three times the tetrahedron edge angle. The tetrahedrons 2b in the middle layer will rest substantially face to face on the tetrahedrons 2a in the bottom layer. The upward-turned sealing edges 3b of the middle layer tetrahedrons will bear with their outer ends against points situated approximately on the centre lines of the container outer walls. The vertical planes of the separate tetrahedrons in both the layers are displaced 30 degrees in relation to one another.

Figure 1C:
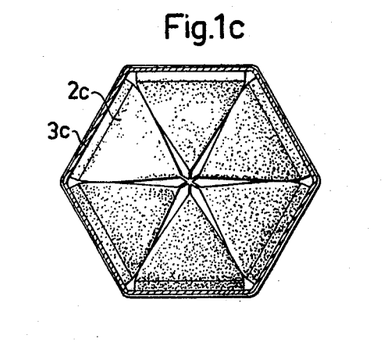

The third or top layer of tetrahedrons 2c is inserted as shown in FIG. 1c with one sealing edge 3c in the horizontal position pressed down below the upper edge of the container and the opposite sealing edge turned substantially along the vertical centre line of the container. As shown in the figure, this layer is also offset 30 degrees in relation to the underlying layer.

Figure 2:
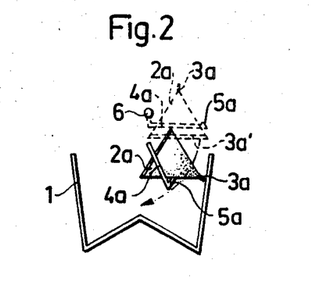
FIG. 2 shows schematically the insertion of a tetrahedron in the bottom layer, FIGS. 2' and 2" show schematically two embodiments of a holder for feeding tetrahedrons in the bottom layer.
Figure 3:
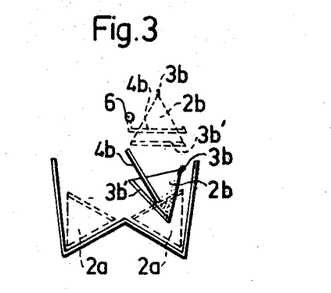
FIG. 3 shows schematically the insertion of the second layer of tetrahedrons, FIGS. 3' and 3" show schematically a holder for feeding the tetrahedrons into the second and third layers.

FIGS. 2 and 3 show how the insertion of the tetrahedrons into the case 1 is intended to be carried out in practice according to the principles of the invention, so that the different layers are given the configuration described above with reference to FIGS 1a–1c. As before, details or operations referring to the insertion of the bottom layer or middle layer have been given the supplementary designations a and b, respectively.

In FIG. 2 the general designation 4a has been given to a holder arranged to be capable of receiving a tetrahedral package 2a, which, together with five other packages, is to be deposited into the container 1 and thus form a bottom layer. Holder 4a is hinged about a pivot 6 in a plane of symmetry of the tetrahedron through its sealing edge 3a' turned towards the container. This plane also coincides with a vertical plane through the vertical axis of the case 1.

By undoing a catch, not shown in the figure, and which in the locked position fixes the holder 4a in the dotted horizontal position shown in FIG. 2, the weight of the tetrahedron 2a will cause it to drop towards the bottom of the container 1 and thereby turn the holder 4a about its pivot 6. In that the holder 4a is turned downwards and inwards towards the central axis of the container into a nearly vertical position, the tetrahedron 2a will naturally tend to slide out of the holder. This tendency is counteracted, however, by a locking element 5a furthest out on the holder and which in the first stage of the holder's travel prevents the tetrahedrons leaving the holder. Instead the tetrahedron will execute a tumbling movement about the locking element 5a—in FIG. 2 in a clockwise direction—so that when the tetrahedron 2a finally leaves the holder 4a, the sealing edge 3a originally turned upwards will drop towards the edge line between the wall and base of the case. In a corresponding manner the originally downward-turned sealing edge 3a' will be turned so that when the tetrahedron has assumed its position in the bottom layer, it is still in the same vertical plane through the container axis and will be turned diagonally upwards-inwards. When the tetrahedron has left the holder, this can be swung up again to its original position by means of a spring or with the aid of some other element, in which the lifting moment need only be dimensioned for the dead weight of the holder.

FIG. 3 illustrates schematically the insertion of a tetrahedral package 2b into the layer that is to form the middle layer in the case 1. As before, holder 4b is hinged in a vertical plane through the container axis about a pivot 6 from a principally horizontal to a nearly vertical position. The vertical plane, however, does not coincide with the previously mentioned vertical plane, but is turned 30 degrees in relation to this. (This angle can be reduced to 15 degrees, which, in a manner that will be described in what follows, can simplify the design and mode of operation of the feeder.) Through this angular displacement the tetrahedron 2b will drop into the wedge-shaped space between two adjacent tetrahedrons 2a in the bottom layer. The holder 4b is not fitted with any locking element at its outer end, such as the element 5a in FIG. 2, and therefore as the holder is successively turned down to its vertical position, the tetrahedron 2b will slide out of the holder without executing any tumbling movement. The sealing edge 3b' will rest on the pyramidal base of the container 1 between two tetrahedrons in the bottom layer, whilst the opposite sealing edge 3b will be resting in the manner shown in FIG. 1b. In a corresponding manner all six tetrahedrons 2b in the middle layer will be deposited gradually or simultaneously.

The tetrahedral packages in the top layer 2c are inserted with the aid of similar, preferably the same, holders as those utilized for insertion of the middle layer. Depositing of the tetrahedrons takes place in a manner analogous to that described with reference to FIG. 3. However, the holder is first turned back 30 degrees. (In the case where the holder has only been turned 15 degrees in relation to the first-mentioned vertical plane, the holder can remain in its position.)

FIGS. 2' and 3' show schematically a holder 4' that can be used for feeding all three layers into the case. The holder 4' has the substantial form of a fork with two legs 7', slightly diverging outwards. The outer parts of the legs are bent to form a locking element 5a', FIG. 2', consisting of two rods 8', about which the tetrahedron 2a can tumble before assuming its position in the bottom layer of the case. This embodiment of the holder is characterized in that the legs 7' can be turned about their respective axes. By this means the locking element can easily be moved aside, FIG. 3', by simply turning the legs 7' so that the rod 8' is shifted to one side. A turning angle of about 90 degrees has proved to be quite sufficient to attain the desired effect.

The embodiment 4a'' according to FIG. 2'' is provided with a fixed locking element 5a'', about which the tetrahedrons are designed to tumble in connection with their arrangement in the bottom layer in the case. The embodiment 4b'' according to FIG. 3'' has no locking device at all, and is intended to be used only for the tetrahedrons that are to be arranged in the middle and top layers in the transport container.

Figure 4:
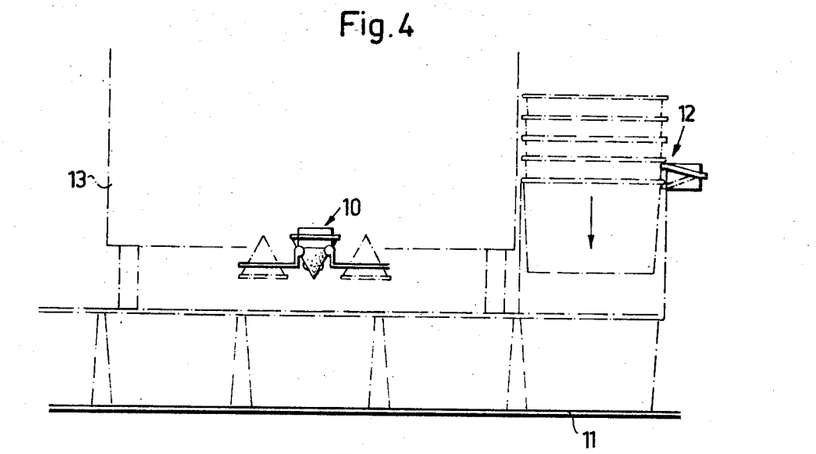
FIG. 4 shows from the side a packing machine that is arranged as a feeder in which is included a holder of the kind described.
Figure 5:
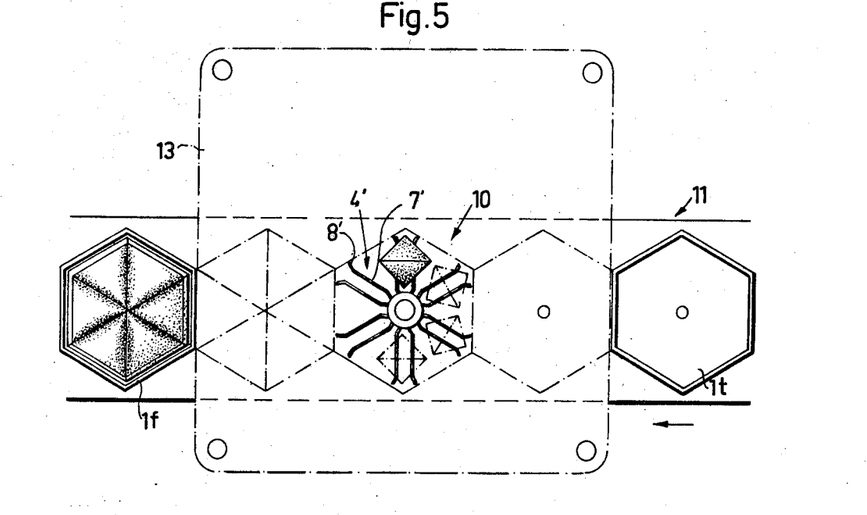
FIG. 5 shows the arrangement according to FIG. 4 as seen from above.

FIGS. 4 and 5 show schematically a feeder 10 that is arranged below a packing machine, 13. Packing machine 13 is of the kind that, working from a web-shaped material, forms a tube that is longitudinally sealed, fills to a predetermined level with liquid material, and seals off and divides into transverse sealing zones to obtain tetrahedral packages, which are brought forward one by one under the machine.

A conveyor belt 11 runs below the machine 13 and feeds the empty cases 1t forward in stages, and carries away the filled cases 1f. 12 designates a magazine with empty cases.

The feeder 10 is of the type that hereinafter will be called "star type." This name has been chosen because the feeder comprises six similar holders that are arranged in a star configuration, as shown in FIG. 5. The holders are preferably of the kind that have been described schematically with reference to FIGS. 2' and 3', i.e., with pivoted legs 7' and rods 8'. A further developed design will be described subsequently with reference to FIGS. 8 and 9. In brief feeder 10 operates in the following manner:

In the initial position the holders 4' are principally in a horizontal position and the rods 8' of legs 7' are turned in. (In FIG. 5 the rod 8' is shown turned to one side.) A tetrahedral package (2a) now drops on to one of the holders 4' and remains lying between the two legs 7' of the holders with its sealing edge (3a') turned towards the bottom of the case. The star is turned 60 degrees about its axis, whereafter a second tetrahedral package drops on to the next holder, which has been brought forward to "a receiving position." The procedure now continues in an analogous manner until all the six holders 4' have each received a tetrahedral package (2a). At the same time that the holders are being filled, an empty case 1t is brought forward to a position below the star. Hereafter an operation follows in which the holders 4' are released instead of being turned about the axis of the star. Due to the action of the weight of the tetrahedrons, the holders are turned downwards towards the base of the case and inwards towards the axis of symmetry common to star and case; the tetrahedral packages will drop tumbling over rods 8' down into the case underneath, which is thus instantaneously filled with a first layer of tetrahedrons; the holders 4' return to their working positions by means of spring force or by some other method; rods 8' are shifted to one side as the legs are turned through a predetermined angle, whereafter the holder last filled is again ready to receive a new tetrahedral package.

In an analogous manner the star is now filled with a further six tetrahedrons (2b). Hereafter follows a dropping operation again. This differs from the previous one, however, in that at the same time as the tetrahedrons drop, sliding out of the holders, the star is turned one stage, i.e. 60 degrees. When the tetrahedrons leave the holders, this turning has only been half completed and the packages will be delivered exactly opposite the wedge-shaped spaces between adjacent tetrahedrons in the first layer in the transport container. The stage is completed in conjunction with the upward movement of the empty holders, so that when a new tetrahedral package is brought forward out of the packing machine 13, a holder is ready to receive the new package.

Insertion of the last layer into the package container takes place in the same way as the insertion of the first one. The rods 8' are still shifted to one side, whereby the packages leave the holders in the desired way. When the holders move up to receive the next set of tetrahedrons, intended to form the bottom layer in the next container, the legs 7' of the holders 4' will be turned so that their rods 8' are again turned inwards as shown in FIG. 2'. One working cycle has now been completed. The filled case is removed, simultaneously as a new case is brought forward on belt 11 to a position under the star 10.

The principal parts of the star are six holders 4' and a shaft, on which the holders are fastened by means of a hinge that can be locked. The feeder equipment preferably includes an exterior control cylinder and some form of element to guide the tetrahedrons when these leave the holders. These guiding elements can consist of, for example, guide plates arranged radially between the holders. Alternatively, as will be shown with reference to FIGS. 8 and 9, the holders can be in the form of scoops, the walls of which act as guiding elements.

Figure 6:
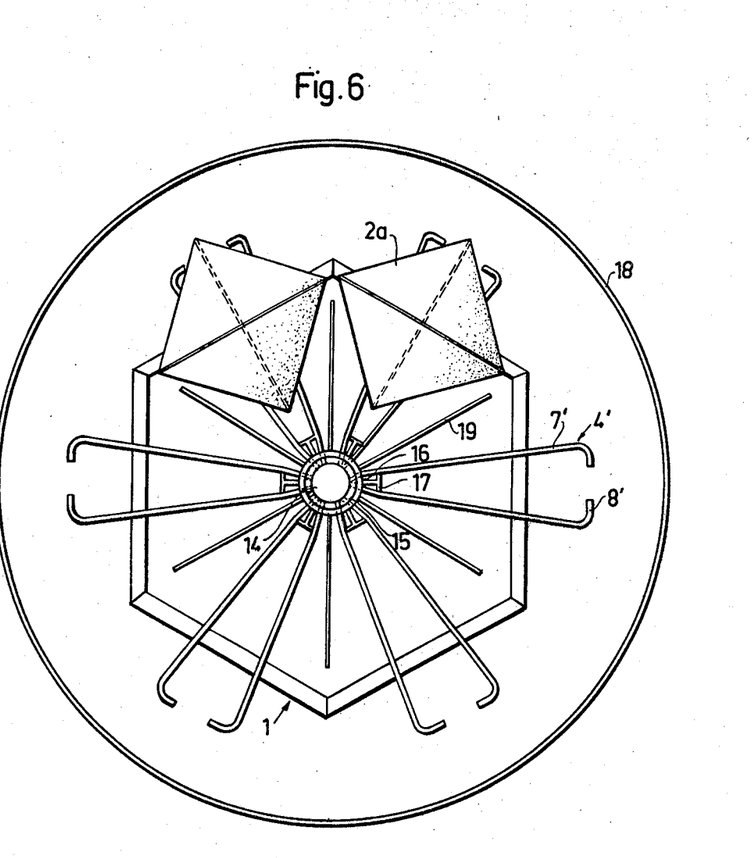
FIG. 6 shows in more detail the feeder according to FIG. 5.

In FIG. 6 a feeder star is shown in more detail as viewed from above. In the center of the star there is, for example, a pipe 14 that can be moved up and down pneumatically and which is arranged to act on one hand as a locking element to retain the holders in a horizontal position even when they are subjected to the relatively great weight of the tetrahedrons, and on the other hand as a rehoisting element for the empty holders. The pipe 14 is arranged to slide in an intermediate pipe 15 to which the holders 4' are pivotally attached. The legs 7' of the holders can be turned about their axes as they are mounted at the actual pivot. The pipe 15 is arranged to transfer the turning moment to the star. Outside the pipe 15 there is a ring 16 that can slide on the pipe 15 and which is arranged to carry out the axial turning of the legs 7' of the holders. For this reason the ring 16 is arranged to be capable of actuating a spring 17 located between each pair of legs, slightly buckled outwards, and securely clamped to both legs, and both defined positions of which determine the position of the rods 8'.

The star is surrounded by a cylinder 18 that is circular at the top and gradually changes to the same hexagonal shape as the case 1 arranged below it. The purpose of cylinder 18 is to ensure that the tetrahedrons are guided down into the case. Between each holder 4' there is a guide plate 19, which extends from about level with the holders in their horizontal position to a certain distance above the case 1.

Figure 7:
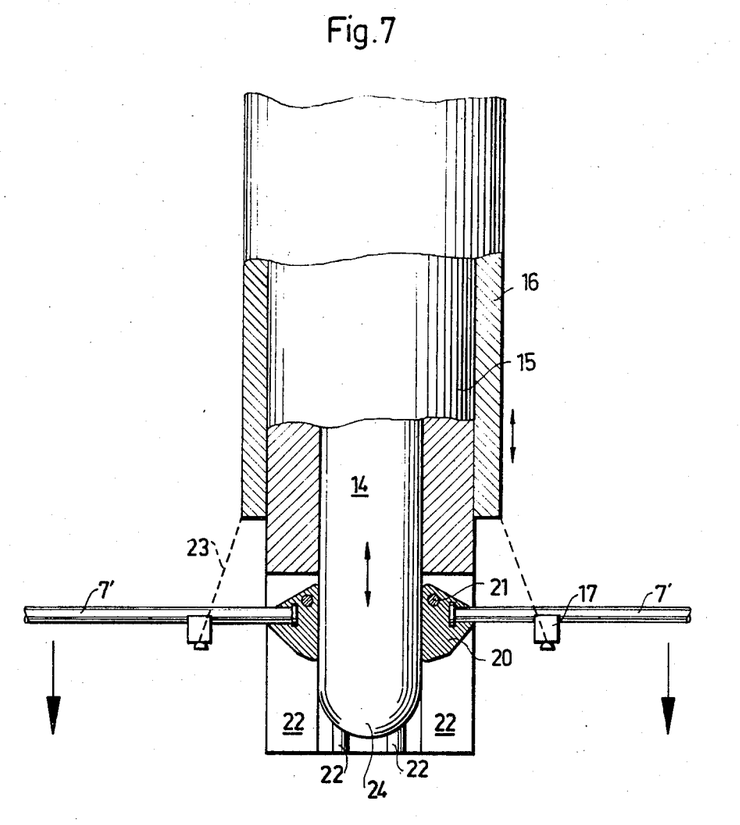
FIG. 7 shows, partly in section, an enlarged detail of the arrangement according to FIG. 6.

FIG. 7 shows in more detail how the lower parts of the centre of the star can be shaped. From the figure it is apparent that the bottom part of pipe 15 has been provided with six slots 22. The designation 20 indicates a pivot body arranged for each pair of legs and in which the legs 7' are pivotally mounted. The pivot bodies 20 can be turned together with the legs 7' in their respective vertical planes through the axis of the star via a pivot pin 21 arranged for each pivot body 20. The pivot pins 21 are secured in the side walls of the slots 22.

The axial twisting of the legs 7' is intended to be performed with the aid of the ring 16, which can be moved up and down pneumatically and which, via a transmission element indicated only by a dotted line 23, is arranged to be able to actuate the springs 17 arranged between the legs 7' of the holder so that these are caused to bend outwards in opposite directions, i.e. assume a new defined position. If for example, the ring 16 in FIG. 7 is moved in the upwards direction and, via the transmission element 23, pulls the springs 17 in the same direction, the springs will buckle out upwards at the same time as they, since they are clamped on to legs 7', will twist the legs a certain angle, by which means the rods 8' of the legs, FIG. 6, will change from the unlocked to the locked position or vice versa.

In the position of pipe 14 shown in FIG. 7 the pipe will act as a lock, i.e. prevent the holders from being let down due to the weight of the tetrahedrons the moment of which is considerable. When the packages on the other side are to be deposited in the case, the pipe 14 is moved in the upward direction, releasing the pivot bodies 20, which hereby under the action of the substantial turning moment will swing in towards the centre axis of the means about the pivot pins 21. When the tetrahedrons have been deposited, pipe 14 is moved down again, thereby only needing to overcome the moment from the dead weight of the holder, which is small. It is therefore possible for the pipe, by means of its rounded bottom part 24, to move aside the pivot bodies 20 again and therewith bring up the holders to the horizontal position.

Figures 8, 9:
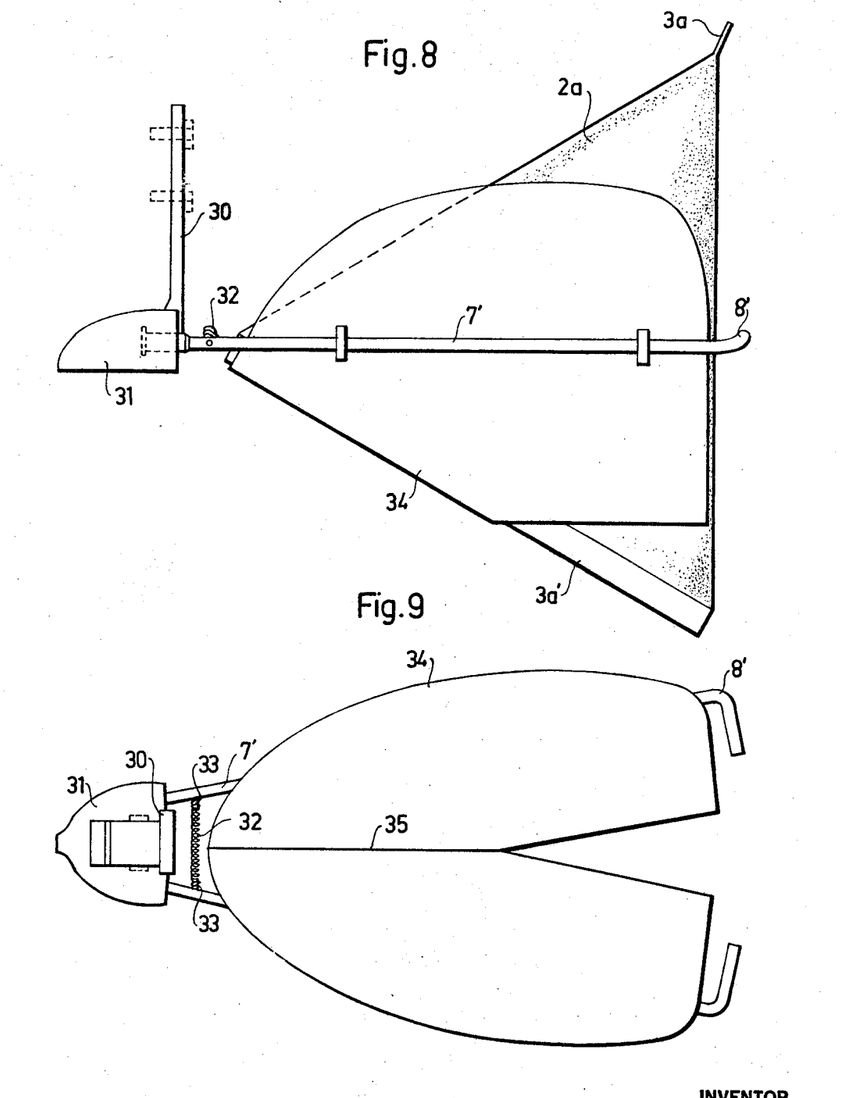
FIG. 8 shows a holder that has been shaped as a scoop.
FIG. 9 shows the arrangement according to FIG. 8 as seen from above.

A modified holder is shown in FIGS. 8 and 9. Its pivoting element has been designed as a hinge, one part of which is fixed to the pipe 15, FIG. 6, and the other part of which comprises the pivot body 31. Axially pivoting legs 7' attached to the pivot body are provided, as before, with rods 8' that can be moved to one side. In this case the spring between the legs has been designed as a coil spring 32 fitted over projections 33 on the insides of the legs. This embodiment is characterized in that it has been provided with a scoop-like element 34, which can be said to replace the guide plates 19 in FIG. 6. The scoop 34 consists principally of a plate that has been folded along a centre line 35. It is supported by the two legs 7', which serve principally in the same manner as previously described. As shown in FIG. 8, the tetrahedron already in its position of rest has a position that is slightly turned from the horizontal. By this means the emptying operation can be performed still quicker than is possible with the holders previously described.

Figure 10:
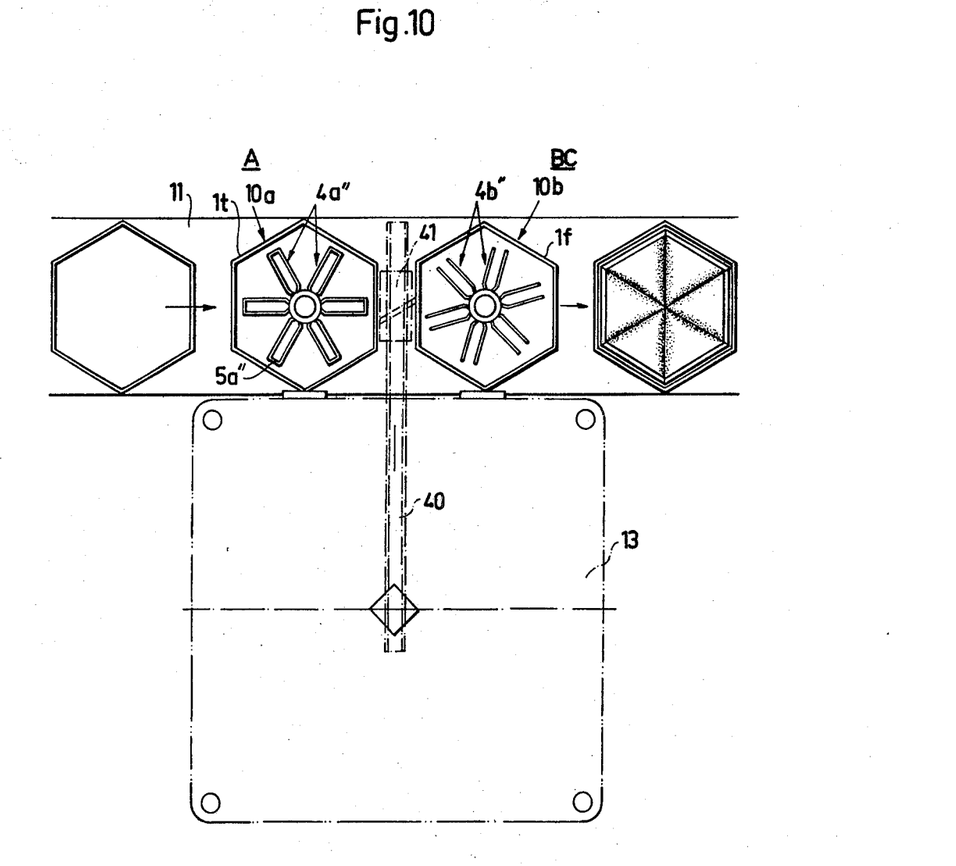
FIG. 10 represents a second embodiment of the invention.

In existing packing machines it is difficult within the small space available to arrange a feeder star immediately below the machine, as shown, in FIGS. 4 and 5. FIG. 10 indicates a solution to the problem of how existing machines could be equipped with a feeder according to the invention. A characteristic feature of this design is otherwise its simple construction; thus, for example, the axially pivoting legs have been replaced by fixed legs, whereby the need for the pneumatically-operated ring 15, FIG. 7, could be eliminated. Further by arranging springs as return elements for the holders, it is also possible to completely eliminate the pneumatic control equipment, which naturally simplifies the equipment considerably. The catch required to lock the holders can be operated by means of an electromagnet.

Some different embodiments of the holders were shown in conjunction with FIGS. 2 and 3. Whilst the designs of the feeder according to FIGS. 4–9 are primarily associated with holders according to FIGS. 2' and 3', holders according to FIGS. 2" and 3" are intended to be used for feeder equipment according to FIG. 10. In the same manner as before, the designations 4a" and 4b" have been used for holders, wherewith the indices *a* and *b* indicate holders intended for feeding tetrahedrons into the bottom, middle and top layers, respectively, of the case.

As shown in the figure, the feeder equipment comprises two feeder stars 10a and 10b, which are composed of six holders 4a" and 4b", respectively. The star 10b is turned 15 degrees in relation to the star 10a. As before, the packing machine is designated 13 and the conveyor belt for cases is designated 11. A conveyor that carries forward tetrahedral packages to the star has been designated 40. This can consist of, for example, two parallel V belts arranged with their narrow edge upwards, so that by wedge action they can receive the tetrahedral packages, which are brought forward with one sealing edge parallel to the V belts and turned downwards. A rocker 41 arranged exactly in front of the stars is arranged to be able to deposit the tetrahedrons either in the holders 4a" or in the holders 4b". It is obvious that the conveyor 40 and the rocker 41 can be designed in a great number of different ways. Thus instead of a V belt conveyor, for example, a chain transmission can be arranged with a number of scoops, such as, for example, according to the previously-mentioned Swedish Patent 191,494.

At the beginning of a working cycle it is assumed that an empty case 1t is located below the star 10a at station A, and a filled case 1f below the star 10b at station BC. By degrees as the tetrahedrons are brought forward by means of the conveyor 40 they are transferred via the rocker 41 to the holder 4a". At the same rate as the tetrahedrons are fed forward the star 10a is turned 60 degrees, so that when six tetrahedrons have been brought forward, the case 1t will be filled.

An operation now follows when the rocker 41 changes over to the other position and discharges the tetrahedrons into the holders 4b". During this time the holders 4a" will deposit their tetrahedrons, which tumble over the locking loops 5a" and drop into the case 1t, whereafter the case is stepped forward by means of the conveyor belt 11 to position BC, at the same time as the case 1f is removed from this position and a new empty case is stepped forward to position A. When the star 10b has received six tetrahedrons, the catch that fixes the holders 4b" in a horizontal position is undone, the holders are folded down and the tetrahedrons will slide down into the case, whereafter the holders immediately swing up again under the action of the previously-mentioned springs, and are ready to take a new set of tetrahedrons. When this set has also been deposited in the case and the rocker 41 has swung back to its original position, a working cycle is complete and the equipment is ready to begin a new one.

Figure 11:
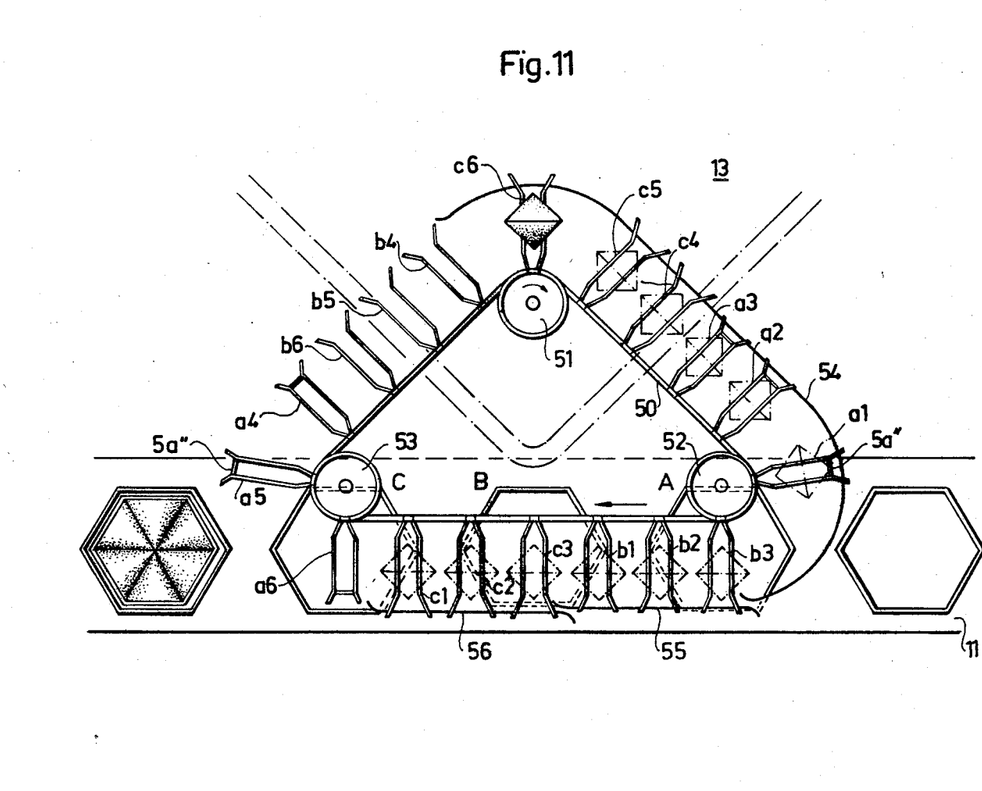
FIG. 11 represents a third embodiment of the invention.

The feeder designs described in conjunction with FIGS. 4–10 have all been of the "star" type. However, the principles of the invention are obviously applicable to other constructional solutions. Thus FIG. 11 shows a design of what could be called a "chain" type or "loop" type. This name has been chosen because the holders are mounted on an endless chain 50. This chain forms a triangular loop, the corners of which are defined by a driving wheel 51 and two pulley wheels 52 and 53. The chain is arranged to be driven in the direction indicated by the arrow. As before, 13 designates a packing machine of the type that produces filled, sealed tetrahedral packages. As stated previously, the space below existing packing machines of the kind in question is relatively small. The driving wheel 51 is therefore arranged preferably lower than the pulley wheels 52 and 53, so that the chain 50 will move upwards between the driving wheel 51 and the first pulley wheel 52, thereby raising the tetrahedrons to a predetermined height that is suitable for the delivery into the cases.

On the chain 50 there are eighteen equally-spaced holders, which are pivotally attached to the chain by pivots 57. If the holders are not subjected to a downward force, they will assume a horizontal position. If, on the other hand, they are subjected to the weight of a filled tetrahedral package and are not held up by means of a locking element, they will be folded down to the vertical position. Return motion is by means of spring force.

The holders are of three kinds intended for the insertion of the bottom layer, middle layer and top layer of tetrahedral packages into the cases. The holders are also divided into groups of three and three. Thus a1–a3 designates three holders designed for insertion of tetrahedrons into the bottom layer. a4–a6 designates a second group of holders intended for the same purpose. In a similar manner b1–b3 and b4–b6 designates holders for the middle layer, and c1–c3 and c4–c6 holders for the top layer of tetrahedrals in the cases.

This embodiment is characterized also by three rails 54, 55 and 56, and in that the holders are extended so that they can rest on these rails. All the holders are sufficiently long to rest on the first rail 54. Holders a1–a6 are slightly shorter than the others and can only rest on this rail. Holders a1–a6 are characterized in that they are also fitted with fixed locking bars 5a''. Holders b1–b6 and c1–c6 can rest on rail 55, but only the holders c1–c6 are sufficiently long to be able to rest on the last rail 56.

This embodiment is characterized also in that insertion is intended to take place at three feeding stations A, B and C, where the bottom layer is inserted at the first station A, the middle layer at station B, and the top layer at station C. The cases are brought forward to the feeding stations on belt 11. The cases are arranged, intermittently or synchronized with the feed of tetrahedrons, to be able to be turned 60 degrees for each tetrahedron that leaves the machine 13. For this purpose rotatable wheels can be fitted under the belt 11, which wheels are arranged to be able to be pushed up through holes in the belt and raise the cases a short distance and turn them in the top layer. Alternatively, the belt 11 can be fitted instead with swivelling plates on which the cases are placed, and at each feeding station at the side of the belt arrange a star wheel that can turn the cases in the desired manner.

When a working cycle is commenced, an empty case is located at station A, a case filled with a bottom layer at station B, and a case filled with two layers of tetrahedrons at station C. Two groups of holders, namely the holders a1–a3 and c4–c6, will rest on the first rail 54. Group b1–b3 rests on the next rail 55, and group c1–c3 on the last rail 56. Each one of the said holders supports a tetrahedral package. The other six holders, namely a4–a6 and b4–b6, are empty, but are in a horizontal position, swung up by means of the return springs.

The cycle is commenced by the chain 50, together with all the holders, being brought forward one step. This means that the holders a1, b1 and c1 simultaneously leave their respective rails 54, 55 and 56. These holders will be thereby swung down by the weight of the tetrahedrons and deposit the packages in the respective cases. In order to obtain the angular displacement of the middle layer characteristic for the packing of the case, the holders b1–b6 can be fitted with a spring 57 capable of swinging the holders 30 degrees to the side, whereby the spring will be released at the latest in conjunction with the hold leaving the rail 55. The same result can also be obtained by turning the case 30 dergees at station B instead. As soon as the holders have deposited their tetrahedrons they will return to their horizontal initial positions due to the action of their respective return springs.

As the chain 50 moves a step forward, a new holder b4 slides up over the rail 54 and can receive a new tetrahedral package at the receiving station opposite the driving wheel 51.

Simultaneously as the chain is again moved forward a stage, all three cases are turned 60 degrees in a clockwise direction, when the cases are again ready to receive a set of 3 x 1 packages, which are deposited when the holders leave their respective rails. The same operation will be repeated a third time; the cases are turned, the chain moves forward a step, the holders lose the support of the rails, swing down and deposit the tetrahedrons in the intended places in the cases, besides which a new tetrahedron is deposited from the packing machine.

During the first three working operations nine tetrahedrons have been deposited, but only three new tetrahedrons have been received. In this position there are tetrahedrons in the holders c4–c6 (were already in position at the commencement of the working cycle) and in the holders b4–b6. During the six subsequent operations, the holders a4–a6 and c4–c6 will also receive a tetrahedron. The cases may continue to be turned in the same manner as before, i.e. 60 degrees at each operation. When the six operations have been completed the cases will have been turned 360 degrees, i.e. one complete revolution.

Now nine operations of the total of eighteen have been completed. The bottom layer, the middle layer and the top layer are now half filled. During the three subsequent operations, which are analogous with the three first, they will be filled completely when the holders a4–a6, b4–b6 and c4–c6 deposit their tetrahedrons.

During the six immediately following operations, a further six holders will be filled with tetrahedrons, besides which there will be a movement of all cases one stage on the belt 11 (to the left in FIG. 11). The working cycle has now been completed and the means is ready to begin a new one.

I claim:

1. Apparatus to feed tetrahedron shaped containers into a transport container that is substantially symmetrical about a central vertical axis comprising: a transport container supporting means, a holder having two outwardly spaced apart projections, means supporting said holder in a horizontal position above said transport container supporting means, said holder having inturned flanges on both of said spaced apart projections to cause tetrahedron packages to tumble when dropped into a transport container, said holder also having means to rotate said spaced apart projections to rotate said inturned flanges, means to supply a tetrahedron package onto said holder with the transverse seal of the tetrahedron falling between said spaced apart projections and means operably associated with said holder supporting means to allow said holder to pivot downward to drop a tetrahedron package into a transport container.

2. Apparatus to feed tetrahedron shaped containers into a transport container that is substantially symmetrical about a central vertical axis comprising: transport container supporting means, a plurality of holders arranged in a star configuration about a center which coincides with the axis of symmetry of a transport container, the number of holders being equal to the number of tetrahedron packages to be packed in each layer, each of said holders having two outwardly spaced projections, means supporting said holders in a horizontal position above said container supporting means, means to supply tetrahedron packages onto said holders with the transverse seal of said packages falling between said spaced apart projections, and means operably associated with said holder supporting means to allow said holders to pivot downwardly to drop said tetrahedron packages into a transport container.

3. The structure of claim 2 wherein said means holding said holder in a horizontal position is movable to allow said pivot means to pivot all of said holders downwardly substantially simultaneously to lay a whole layer of tetrahedrons in said transport container at one time.

4. Apparatus to feed tetrahedron shaped containers into a transport container that is substantially symmetrical about a central axis comprising: transport container supporting means, a holder having two outwardly spaced projections, means supporting said holder in horizontal position above said transport container supporting means, means to supply a tetrahedron package onto said holder with the transverse seal of said tetrahedron package falling between said spaced apart projections, means operably associated with said holder supporting means to allow said holder to pivot downwardly to drop tetrahedron packages into a transport container, and means to return said holder to the horizontal position after being pivoted downwardly, said return means including a shaft member acting against a cam member to pivot said cam member to raise said holder connected thereto.

References Cited

UNITED STATES PATENTS

| | | | |
|---|---|---|---|
| 2,908,125 | 10/1959 | Jarund | 53—142 |
| 3,282,024 | 11/1966 | Anderson | 53—142 X |
| 3,396,507 | 8/1968 | Morris et al. | 53—164 X |

THERON E. CONDON, Primary Examiner

R. L. SPRUILL, Assistant Examiner

U.S. Cl. X.R.

53—164, 244, 247